March 6, 1956  L. W. EVANS ET AL  2,737,389
ARTICLE HANDLING APPARATUS
Filed Sept. 26, 1950  15 Sheets-Sheet 5
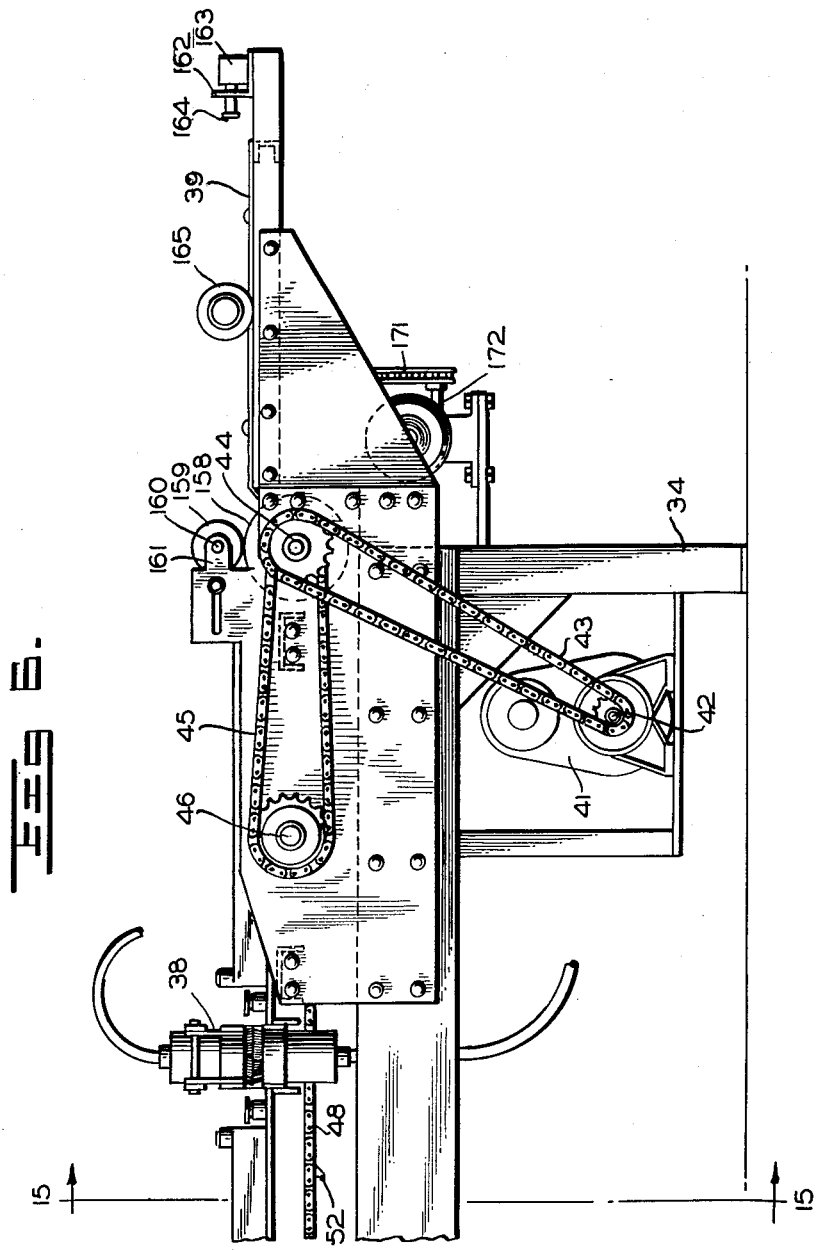
INVENTOR
LLEWELLYN W. EVANS
WILLIAM FUNK
BY Cushman, Darby & Cushman
ATTORNEY March 6, 1956   L. W. EVANS ET AL   2,737,389
ARTICLE HANDLING APPARATUS
Filed Sept. 26, 1950   15 Sheets-Sheet 6
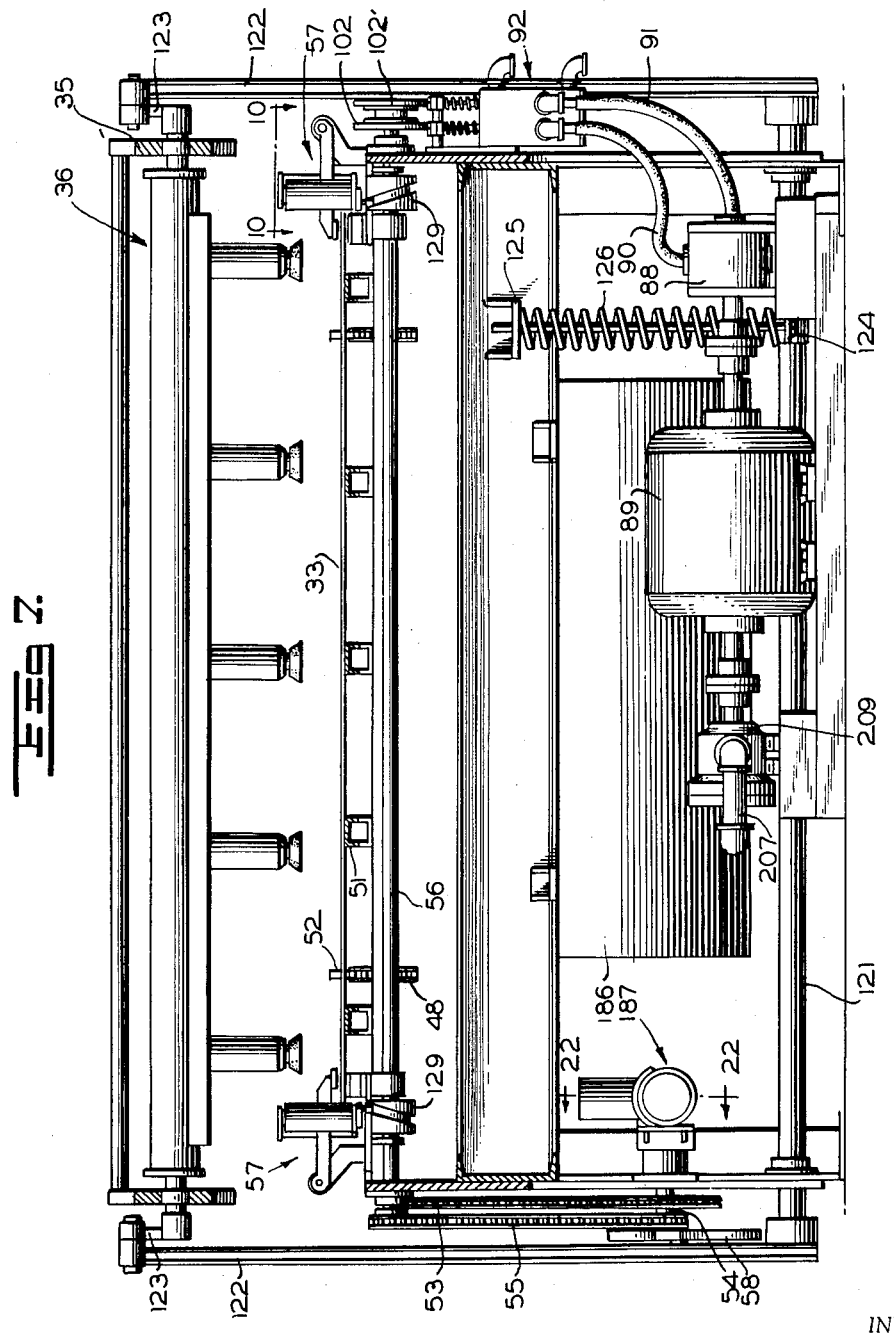
INVENTOR
LLEWELLYN W. EVANS
WILLIAM FUNK
BY *Cushman, Darby & Cushman*
ATTORNEY

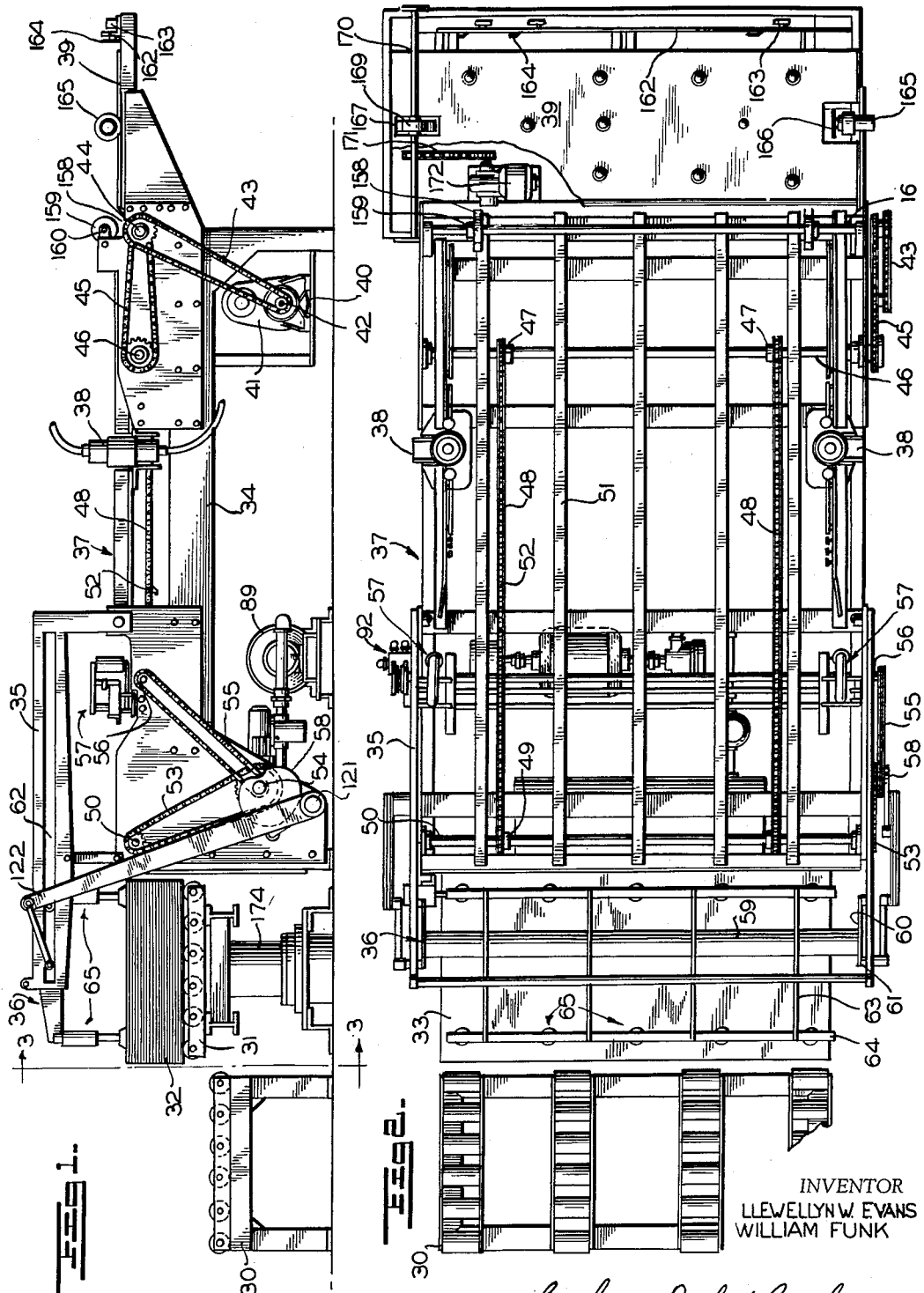

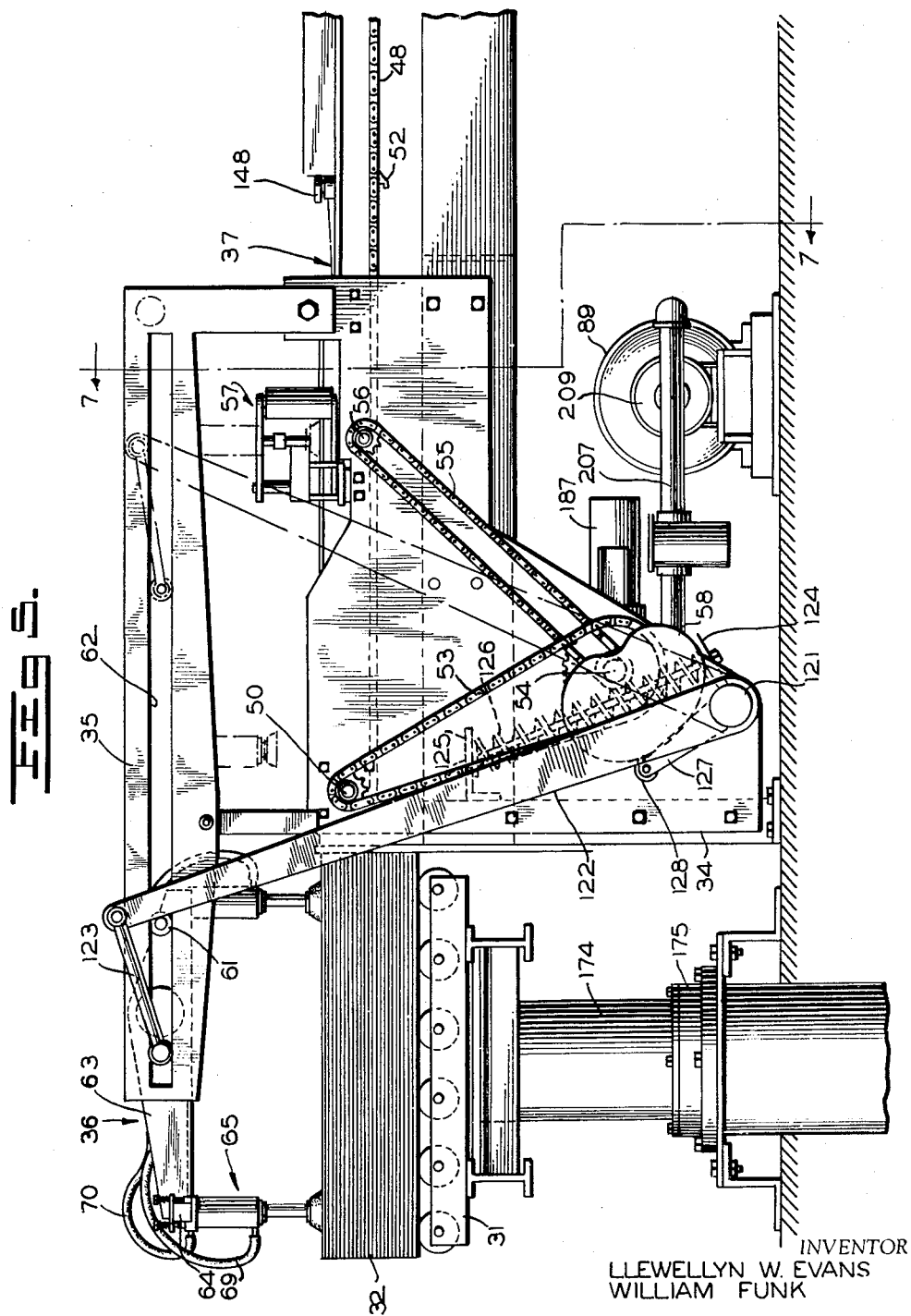

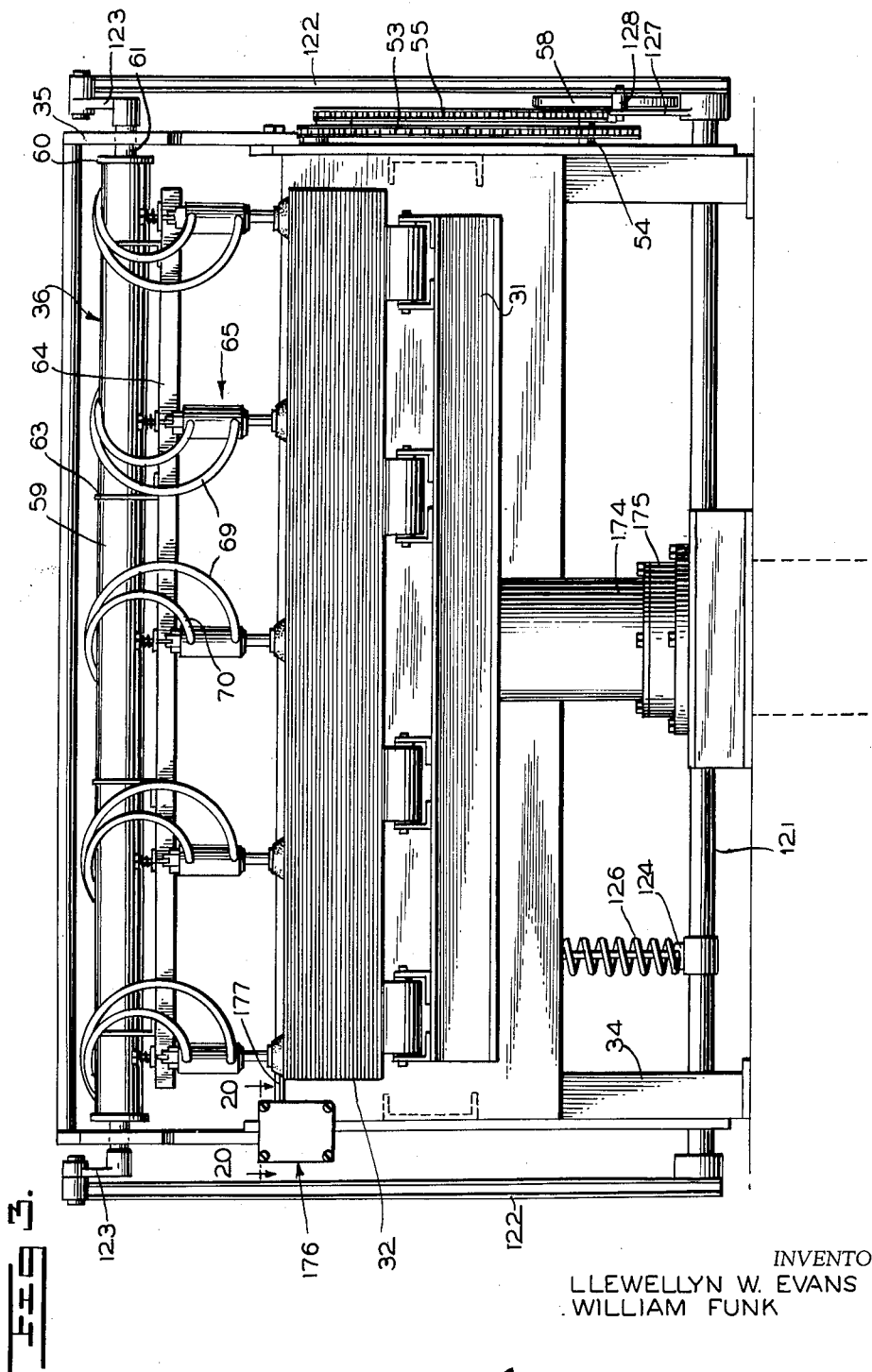

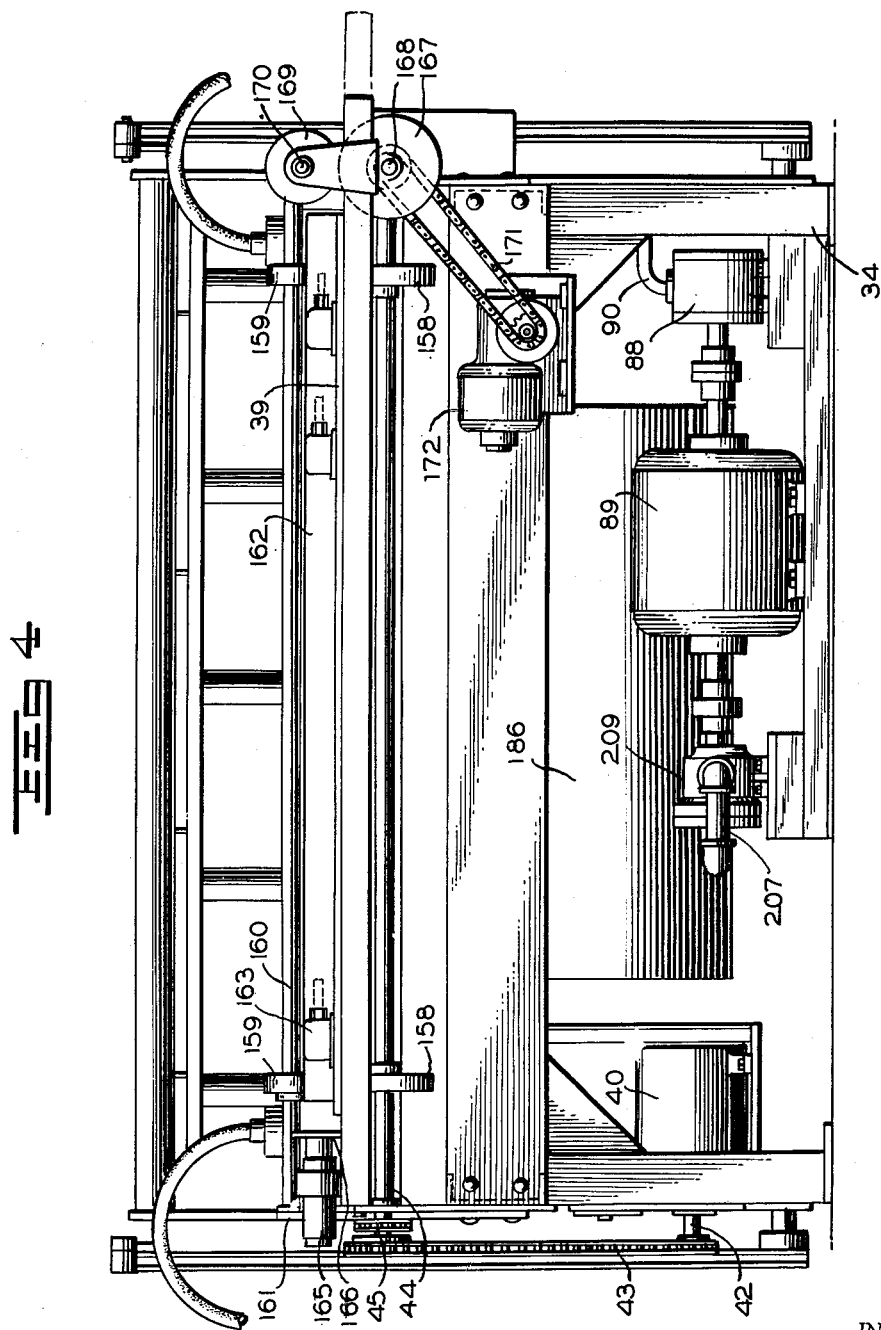

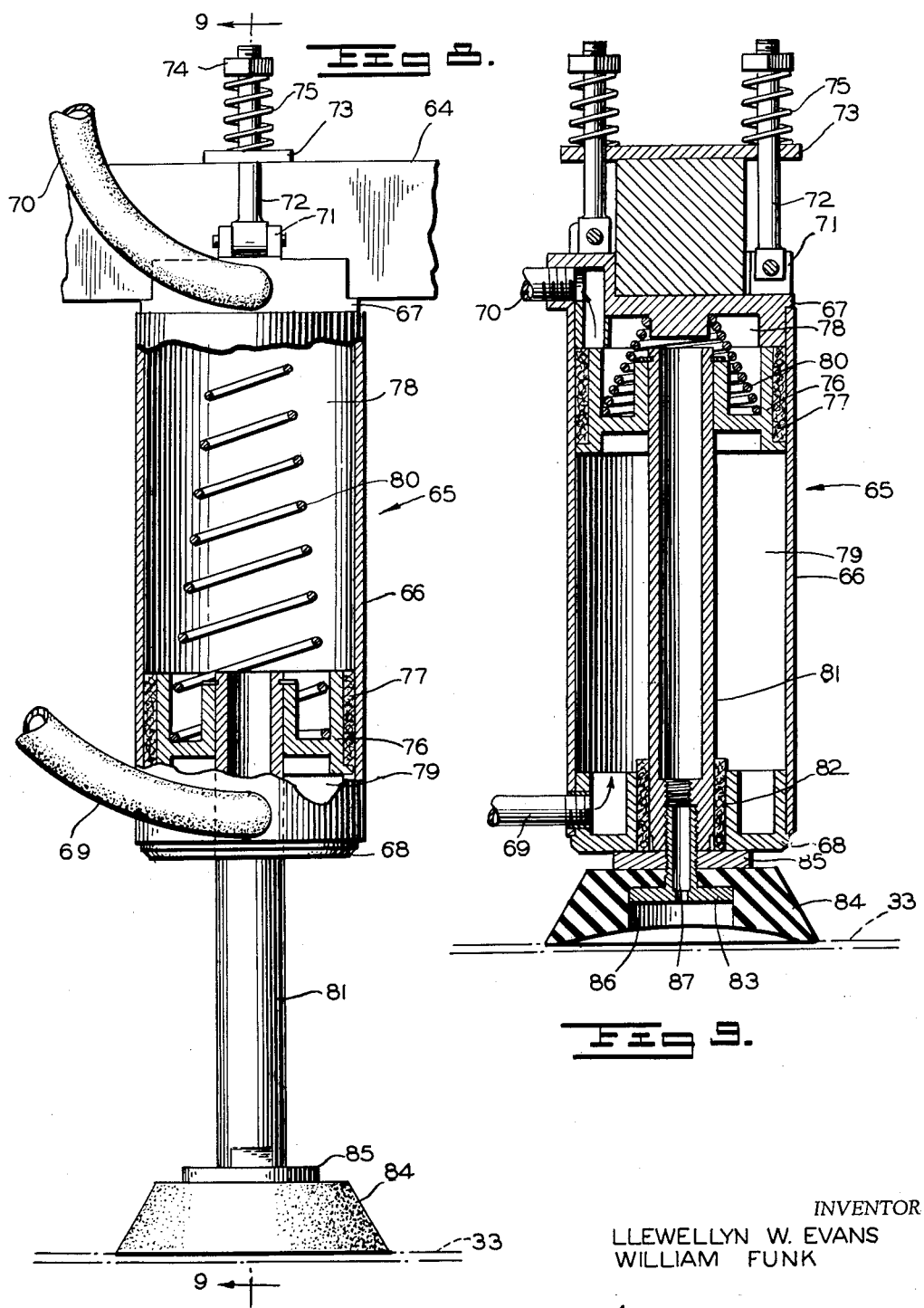

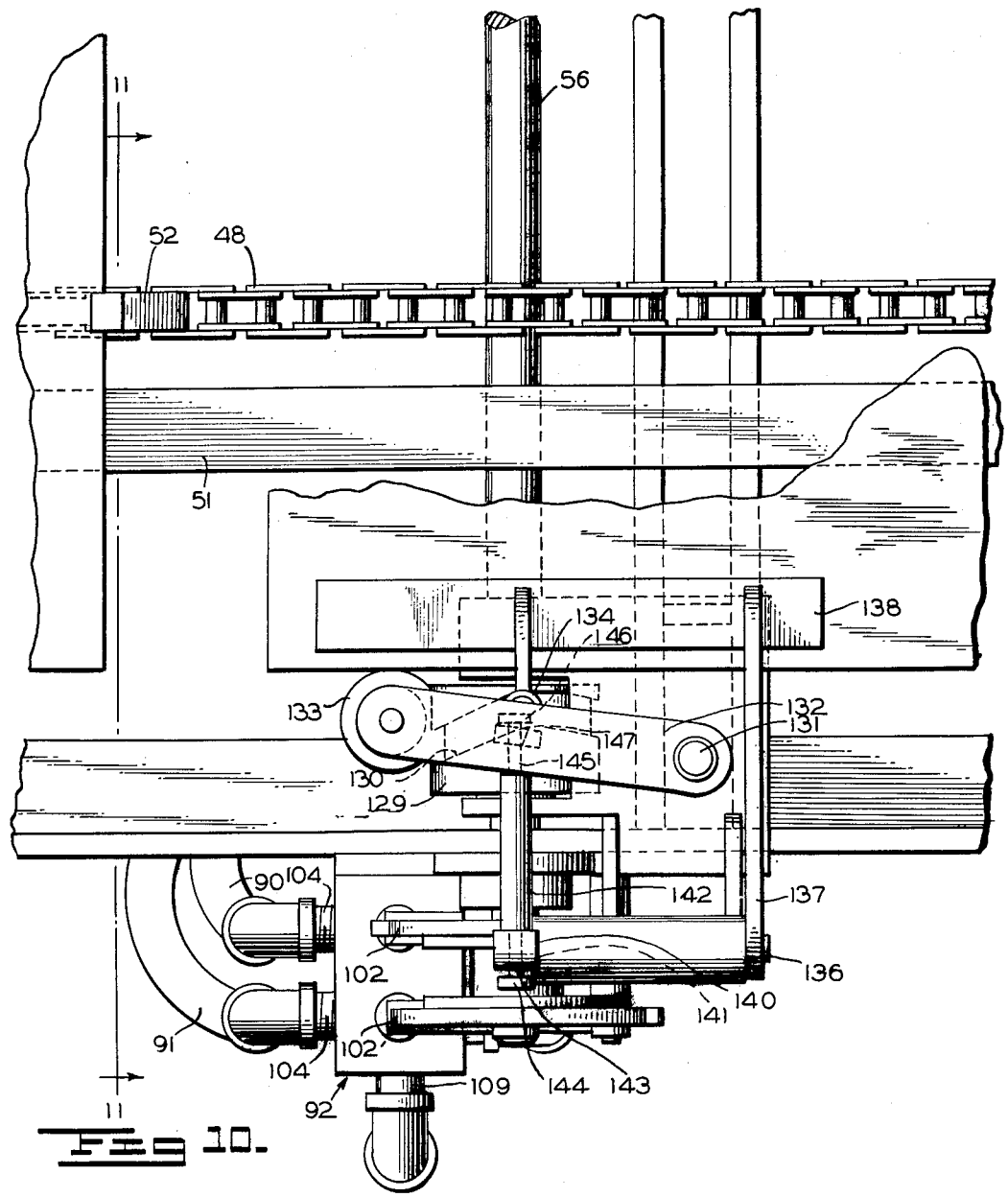

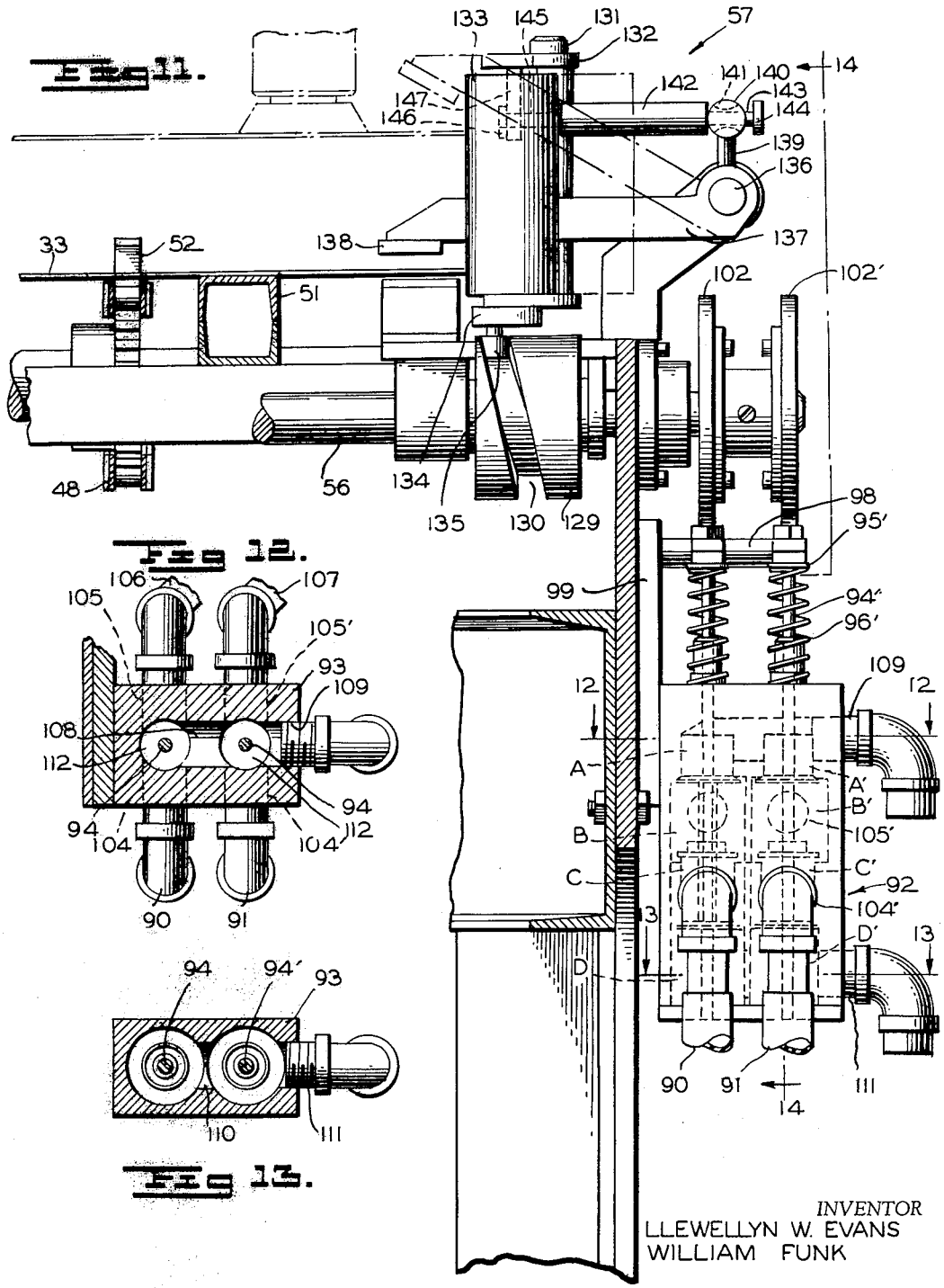

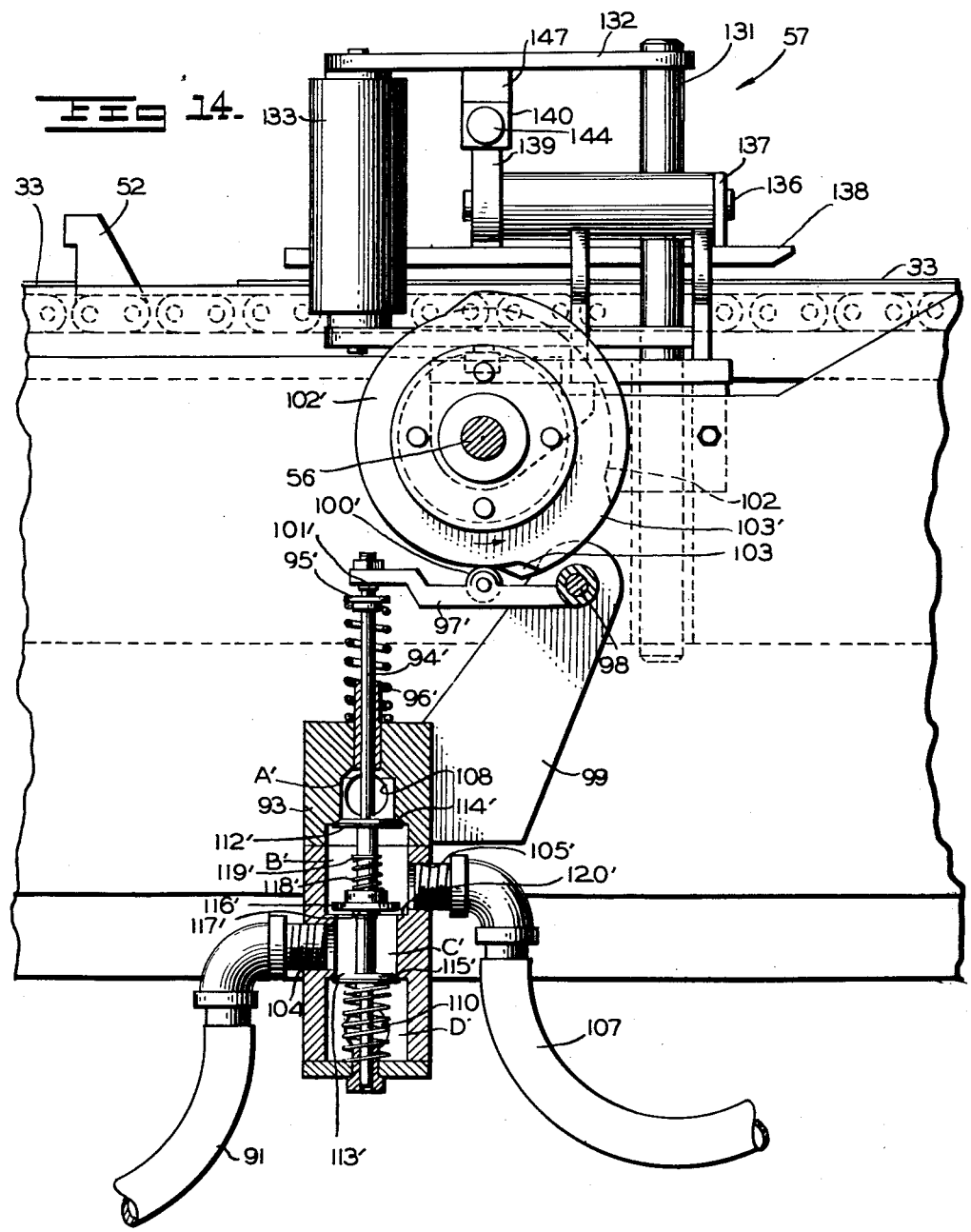

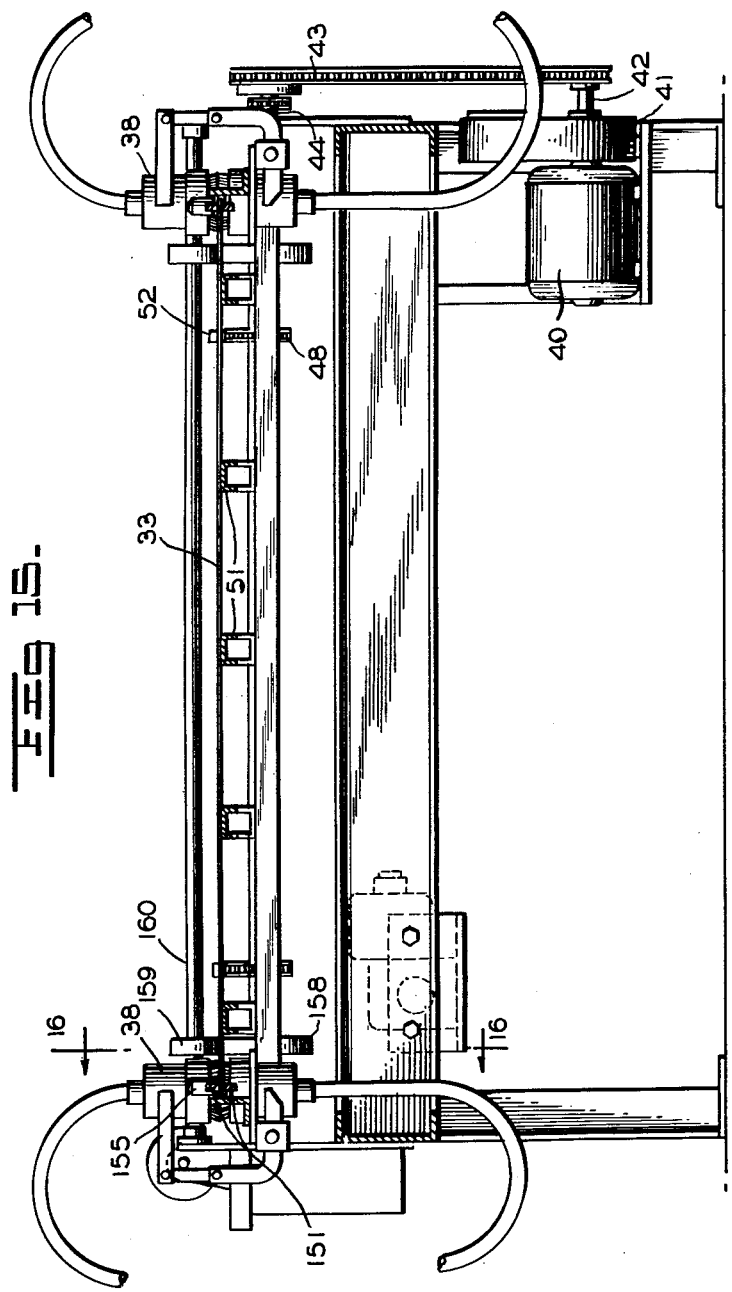

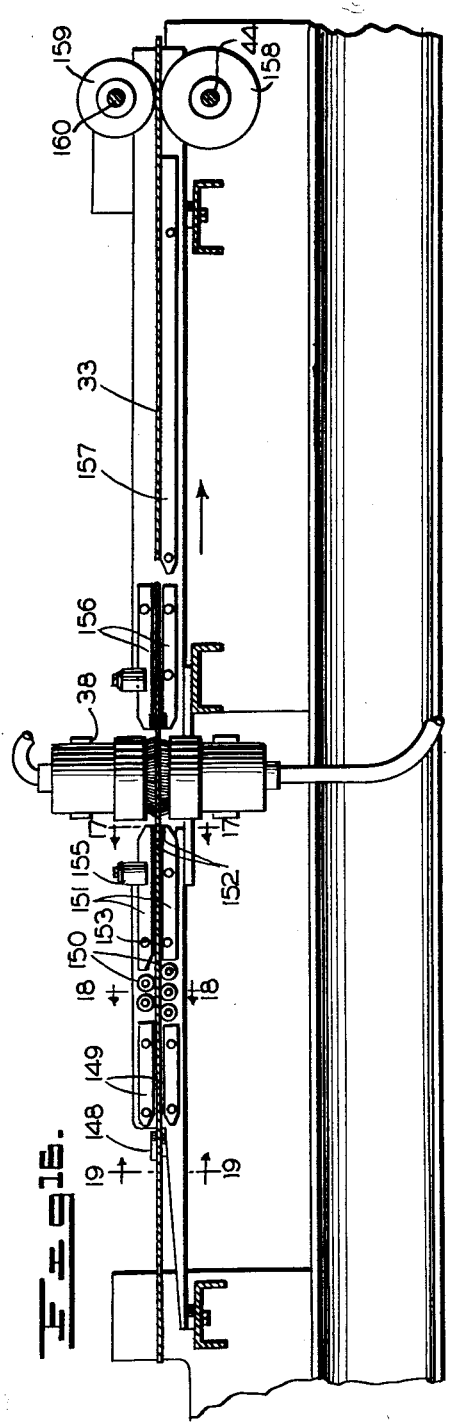

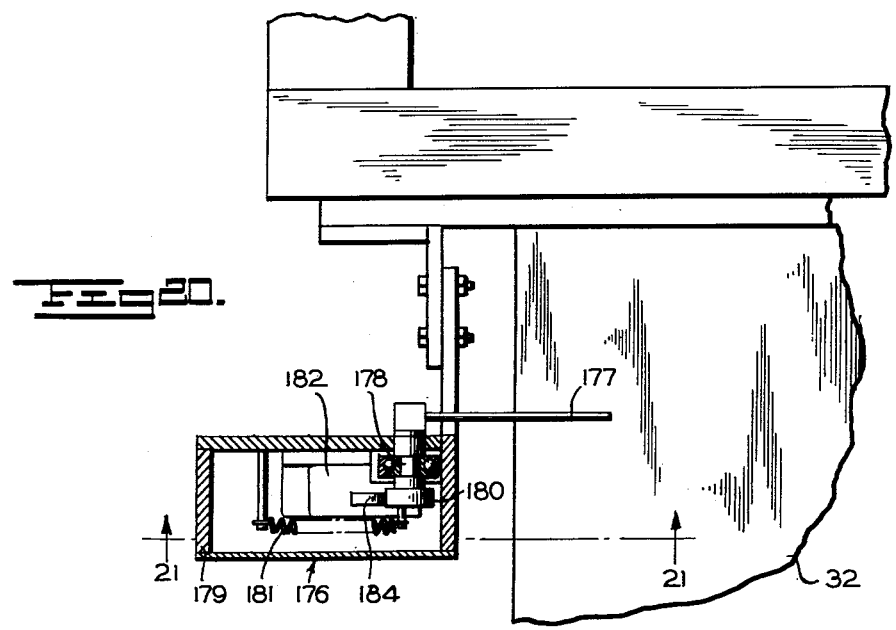
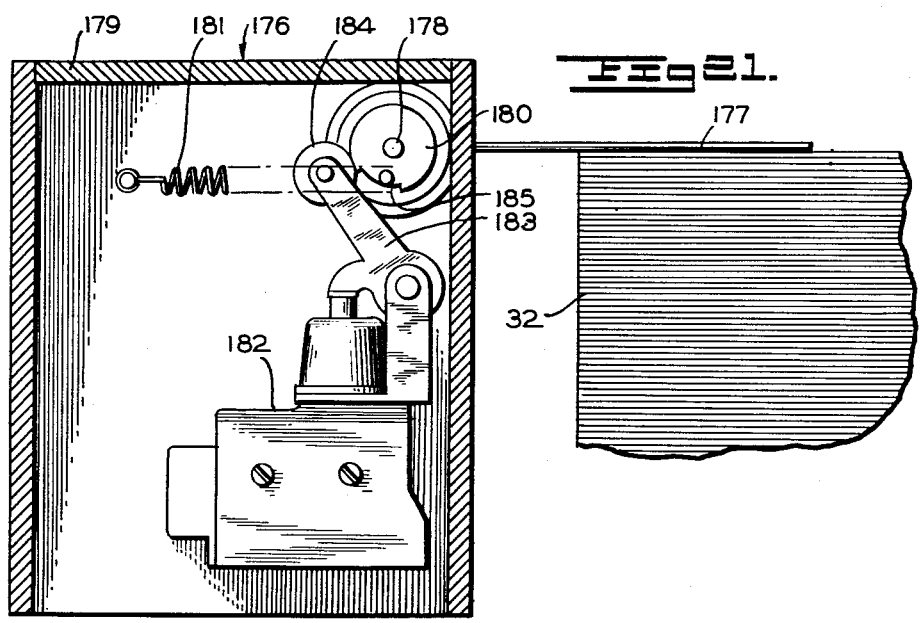

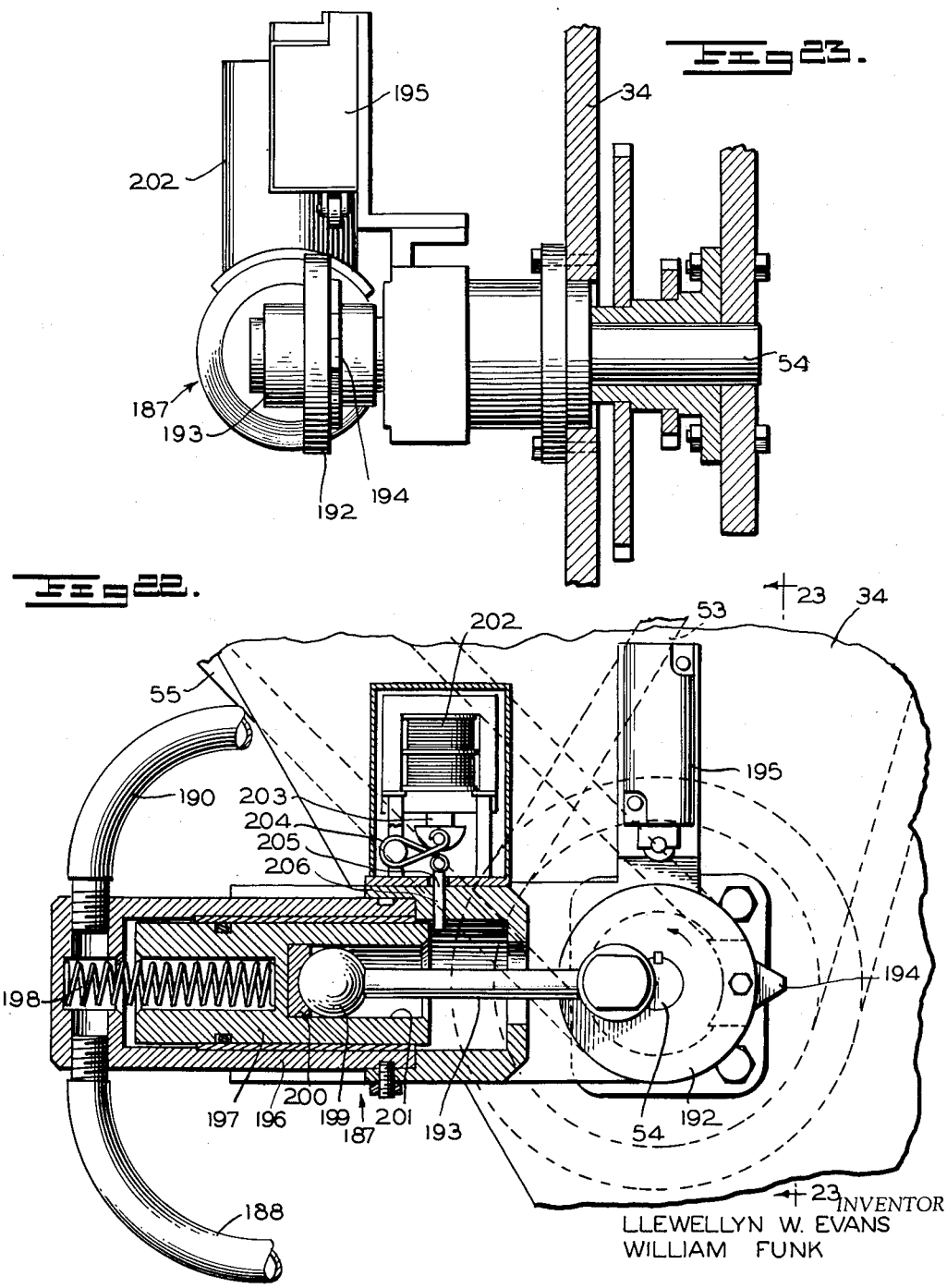

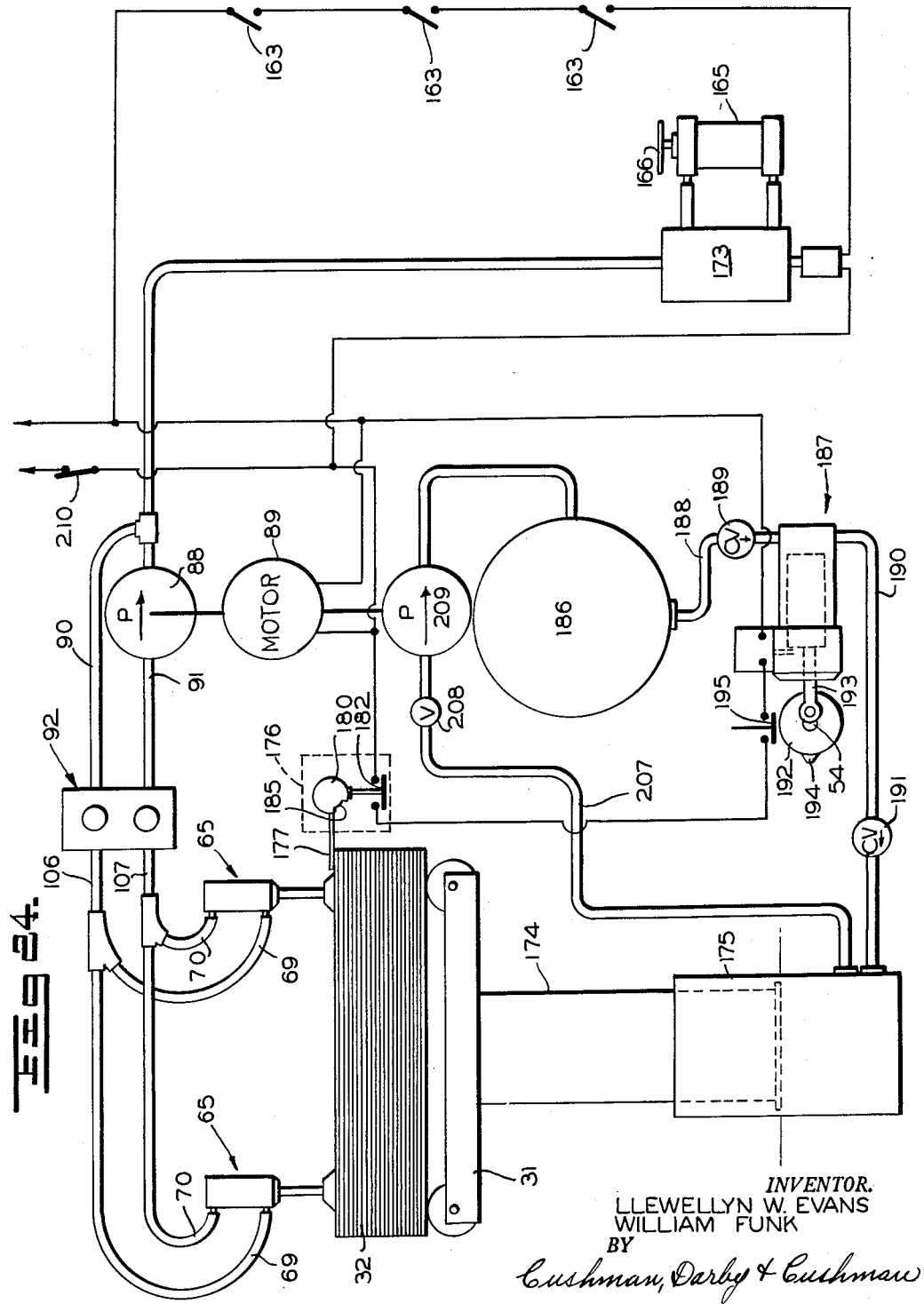

United States Patent Office 2,737,389
Patented Mar. 6, 1956

2,737,389

ARTICLE HANDLING APPARATUS

Llewellyn W. Evans, South Gate, Calif., and William Funk, Houston, Tex., assignors to Rheem Manufacturing Company, Richmond, Calif., a corporation of California Application September 26, 1950, Serial No. 186,741

4 Claims. (Cl. 271—48)

This invention relates to article handling apparatus, particularly to apparatus for the individual feeding and preliminary treatment of sheet articles. The invention is adapted for employment, for example, as the initial machine in a continuous line for the manufacture of steel drums, such containers being commonly manufactured from flat steel plates which eventually form the body portion thereof. Methods have recently been devised whereby the stock steel sheets may be preliminarily coated and/or lithographed on one or both sides before fabrication into drums, whereby, as will be readily recognized, special handling of the stock throughout fabrication is required, to avoid impairment or destruction of the coating or surface of the steel sheets.

It is among the objects of the present invention, accordingly, to provide mechanism for continuously and automatically feeding individual steel sheets from a vertically movable stock pile, the sheets being engaged by suction, and lifted and carried to a position over a conveyor, onto which they are discharged, including coordinated means for aligning sheets discharged onto the conveyor, means for treating edges of the sheets in passage along the conveyor, and means for ejecting sheets from the conveyor to a succeeding machine in line. Further objects of the invention will be in part obvious and in part pointed out hereinafter.

The invention and the novel features thereof may best be made clear from the following description and the accompanying drawings, in which:

Figure 1 is a side elevational view of an exemplary embodiment of the present invention;

Figure 2 is a plan view of the embodiment of Figure 1;

Figure 3 is an end elevational view taken on the line 3—3 of Figure 1, showing the infeed end of the machine;

Figure 4 is an end elevational view of the embodiment of Figure 1, showing the outfeed end of the machine;

Figures 5 and 6 are enlarged side elevational views together corresponding to Figure 1, showing details of construction and arrangement;

Figure 7 is a sectional view taken along the line 7—7 of Figure 5, showing details of the aligning mechanism drive;

Figure 8 is an enlarged view, partly broken away, of a preferred feed element of the invention;

Figure 9 is a sectional view of the feed element of Figure 8, taken along the line 9—9 thereof, showing the element in retracted or up position;

Figure 10 is an enlarged plan view of the aligning mechanism and its drive, taken along the line 10—10 of Figure 7;

Figure 11 is a correspondingly enlarged view of the aligning mechanism and its drive, and showing the associated feed control mechanism, taken along the line 11—11 of Figure 10;

Figure 12 is a sectional view through the feed control valve, taken on the line 12—12 of Figure 11;

Figure 13 is a sectional view through the feed control valve, taken on the line 13—13 of Figure 11;

Figure 14 is a sectional, elevational view through the feed control valve, showing details of its control mechanism, taken along the line 14—14 of Figure 11;

Figure 15 is a sectional view taken along the line 15—15 of Figure 6, showing the edge treatment mechanisms associated with the machine conveyor;

Figure 16 is a sectional view taken along the line 16—16 of Figure 15;

Figures 17, 18 and 19 are enlarged views of sheet guiding means disposed to insure proper alignment of sheets carried by the conveyor through the edge treatment means, taken, respectively, along the lines 17—17, 18—18 and 19—19 of Figure 16;

Figure 20 is an enlarged sectional plan view of the elevator platform control mechanism, taken along the line 20—20 of Figure 3;

Figure 21 is a correspondingly enlarged sectional view of the elevator platform control mechanism, taken along the line 21—21 of Figure 20;

Figure 22 is an enlarged sectional view of the elevating mechanism, taken along the line 22—22 of Figure 7;

Figure 23 is an enlarged view of the platform elevating mechanism, taken along the line 23—23 of Figure 22, and Figure 24 is a simplified diagrammatic sketch illustrating the electrical, pneumatic and hydraulic systems of the machine.

Referring to the drawings, the exemplary embodiment of the invention is best shown in Figures 1 and 2, wherein a stock platform 30 is provided at the infeed end of the sheet handling machine, and adjacent thereto an elevator platform 31, upon which a pile or stack 32 of steel sheets 33 is positioned. The main machine frame 34 supports a guide structure 35 thereabove, in which a feed carriage 36 is slidably mounted, the feed carriage being adapted to reciprocate relative to the guide structure from a position over elevator platform 31 to a position over the adjacent end of the conveyor section of the machine, indicated generally as 37. The conveyor section extends between a pair of laterally spaced edge treating mechanisms 38 to transfer table 39, adapted to receive sheets from the conveyor and eject them laterally, ordinarily to another machine in line, which may roll the sheets and weld them into cylindrical bodies.

The conveyor and associated mechanism is driven by a conventional source of power such as motor 40, through its reduction gear box 41 and take-off shaft 42. From the take-off shaft, power is transmitted through chain 43 to an outfeed shaft 44, and from outfeed shaft 44 through chain 45 to the conveyor drive shaft 46, suitably mounted in the machine frame and extending thereacross. Shaft 46 mounts a plurality of drive sprockets 47, to which are engaged conveyor chains 48, extending about the drive sprockets and the sprockets 49 carried by shaft 50, suitably mounted adjacent the infeed end of the conveyor. The conveyor chains are disposed between support bars 51, slightly below the level of the upper surfaces thereof, and include drive lugs 52, which extend above the level of the support bars to engage and displace successive sheets.

The drive is transmitted from shaft 50 through an end sprocket and chain 53 to a stub shaft 54 mounted below the frame, and from the stub shaft through chain 55 to a shaft 56, which drives the aligning mechanisms indicated generally as 57. Stub shaft 54 also mounts a cam 58, which functions to effect reciprocation of the feed carriage 36 within its guide structure 35, in a manner presently to be described.

The feed carriage 36 is composed of a central tubular housing 59, to the ends of which are fixed guide bars 60 having a plurality of guide lugs 61 extending therefrom through guide slots 62 of the guide structure. The housing 59 supports a plurality of transversely spaced brackets 63, to which are fastened a longitudinally spaced pair of cross bars 64. Each cross bar mounts a plurality of the feed elements indicated generally as 65.

A preferred feed element of the invention is best illustrated in Figures 8 and 9, wherein it will be seen that the element comprises a tubular body 66, closed at its upper end by top plate 67 and at its lower end by bottom plate 68 to define a pneumatic cylinder. A flexible pressure line 69 is provided in communication with bottom plate 68 and a similar vacuum line 70 in communication with top plate 67. The top plate is also provided with upstanding lugs 71 to which bolts 72 are engaged, the bolts extending alongside cross bar 64 and through an anchor plate 73, to which the bolts are engaged by means of nuts 74 and springs 75, whereby the feed element is resiliently engaged to the cross bar.

A piston 76 is slidably mounted within the cylinder body 66, the piston being suitably sealed against the inner surface thereof as by seal 77. The piston effectively divides the cylinder into vacuum compartment 78 and pressure compartment 79. A coil spring 80 or equivalent resilient element is disposed within the vacuum compartment 78, and tends to maintain the piston 76 spaced remote from top plate 67.

A hollow rod 81 is fixedly engaged to the piston, and extends therefrom through the pressure compartment 79 and bottom plate 68 of the cylinder, the rod being slidably sealed relative to the bottom plate by seal 82. The upper end of the rod is in open communication with vacuum compartment 78. At the outer end of the hollow rod, a retainer disc 83 is threadably engaged thereto, the retainer disc serving to retain a vacuum cup 84 and bumper disc 85 on the end of the rod. The retainer disc is positioned within the central vacuum chamber 86 of the vacuum cup, and by reason of the passage 87 through the retainer disc, vacuum chamber 86 is in open communication with the interior of the hollow rod, and thereby with the vacuum compartment 78 of the cylinder. As indicated, the vacuum cup is formed of rubber or similar elastic material, and its under surface, outside vaccum chamber 86, is shaped in concave form.

The feed elements are powered by an air pump 88, driven by a motor 89, conveniently located beneath the machine conveyor, as shown in Figures 1 and 7. From pump 88, flexible pressure line 90 and vacuum line 91 lead, respectively, to the pressure and vacuum sides of the feed control valve indicated generally as 92. As indicated in Figures 11 and 14, valve 92 comprises a body 93 of dual construction, each side thereof including four in-line chambers. The chambers of the pressure side of the valve are indicated as A, B, C and D, and corresponding chambers of the vacuum side as A', B', C' and D'. Each side of the valve has a rod 94 extending axially therethrough, the upper end of the rod being provided with a collar 95, which serves to retain a valve spring 96 between the collar and the upper surface of the valve body. The valve spring functions in usual manner to maintain the valve rod normally in up position.

Each valve rod is adapted to be depressed by a rocker arm 97, pivotally mounted on a pivot 98 extending from a bracket 99 fixed to the machine frame, the bracket serving also to support the valve body 93. Intermediate its length, each rocker arm carries a cam follower 100, and at the outer end of each rocker arm is provided an adjustable bearing block 101, disposed in pressure engagement with the upper surface of the associated valve rod collar.

The cam followers ride the edge surfaces of cams 102, fixed to an end of shaft 56 in alignment with the followers. Each cam is provided with an angularly elongated lobe 103.

Each of the valve chambers C and C' is provided with an inlet 104, which are in communication, respectively, with the lines 90 and 91 from air pump 88. Each of the valve chambers B and B' is provided with an outlet 105, the outlet from chamber B being in communication through pressure line 106 with a manifold (not shown) which supplies each of the pressure lines 69 leading to the individual feed elements 65. The outlet from chamber B' is in communication through vacuum line 107 with another manifold, by which it is connected to each of the vacuum lines 70 of the individual feed elements. The chambers A and A' of the valve are interconnected by means of cross passage 108, and open to the atmosphere by means of passage 109 (see Figures 11 and 12). The valve chambers D and D' are interconnected by means of cross passage 110, and open to the atmosphere by means of passage 111 (see Figures 11 and 13).

Each valve rod carries valve discs 112 and 113 affixed thereto, disc 112 being adapted to seat upon valve seat 114 between chambers A and B, and disc 113 being adapted to seat upon valve seat 115 between chambers C and D. Discs 112 and 113 are so spaced along the valve rod, in relation to the spacing between seats 114 and 115, that these discs seat simultaneously. The valve rod also carries a valve disc 116 slidably mounted thereon, the disc being constantly urged against a stop 117 by the bias of spring 118, which is retained at its upper end by a collar 119. The disc 116 is adapted to seat upon the valve seat 120 between chambers C and D. For clarity and convenience of reference, valve and cam parts associated with the vacuum side are in each case distinguished by a prime.

As previously indicated, reciprocation of the feed carriage 36 is effected by rotation of the cam 58 mounted on stub shaft 54. As best seen in Figures 5 and 7, a rock shaft 121 is rotatably mounted in suitable bearings below the machine frame, the rock shaft extending across the width of the machine and carrying at each end thereof an outwardly extending arm 122. The outer end of each arm is engaged to one of the guide lugs 61 of the feed carriage, by means of a pivotal link 123. Intermediate its length, the rock shaft is provided with an outwardly projecting plate 124, between which and retaining plate 125 mounted on the underside of the frame a properly guided compression coil spring 126 is retained. As is apparent, the coil spring 126 tends constantly to rotate the rock shaft in clockwise direction as viewed in Figure 5, whereby the arms 122 are urged toward the dotted line position shown in that figure. Also extending from rock shaft 121, in general alignment with cam 58, is a roller arm 127, bearing at its outer end a cam following roller 128. As will be evident, the roller 128 is maintained in pressure contact with the outer surface of cam 58 by the action of spring 126, whereby the rocking movement of the roller arm in following the cam surface is in opposition to the action of the spring.

The mechanism previously described is effective to lift individual sheets 33 from the stock pile on elevator platform 31, carry them to a position over the conveyor section of the machine, and drop them onto the conveyor. The aligning mechanisms 57 are provided at each side of the conveyor to properly align each successive sheet as it is placed thereon, in coordinated fashion. To attain this end, as best shown in Figures 7, 10 and 11, the shaft 56 carries adjacent each end thereof a cylindrical cam 129, provided with a continuous cam groove 130. A vertically disposed pivot 131, mounted on the machine frame adjacent each side of the conveyor, mounts a pair of vertically spaced arms 132, which extend outwardly therefrom and retain between their outer ends a vertically disposed guide roller 133. The lower arm 132 is provided with a lug 134, on the underside of which is mounted a cam follower 135, retained in engagement with the groove 130.

Associated with each guide roller 133 and its mounting is a horizontally disposed pivot 136, also mounted on the frame, from which a pair of longitudinally spaced arms 137 extend inwardly to a position over the machine conveyor. At their inner ends, the arms 137 support a guide plate 138. A short rocker arm 139 extends upwardly from pivot 136, the rocker arm terminating in a bearing cylinder 140, suitably apertured as at 141 for passage therethrough of slide 142. Slide 142 comprises a thickened central portion, a section 143 of reduced diameter extending through aperture 141 of the rocker arm bearing cylinder, and an outer collar 144. The other end of slide 142 is formed into a section 145 of reduced diameter, and a collar 146 at the outer end thereof. An apertured lug 147 extends downwardly from the upper arm 132, the reduced section 145 of the slide 142 being retained within the lug aperture by collar 146.

The sheets having been placed on the conveyor and properly aligned, they are carried thereby through the edge treating mechanisms 38, one of which is disposed at each side of the conveyor. If the sheets have been preliminarily coated, the edge treating mechanisms may be adapted to remove the coating from the edge portions of the sheets, and expose fresh surfaces for an ensuing welding operation. In the embodiment disclosed by way of example, the edge treating mechanisms are illustrated as shot blast units, adapted to clean the edge portions of the sheets on one or both sides, and expose fresh surfaces. The particular edge treating mechanisms employed do not constitute a part of the present invention, and may be of any conventional type, or may be omitted if not required, and accordingly are not described in detail.

When required, means may be provided to accurately guide the steel sheets through the edge treating mechanisms. As shown in Figures 16 to 19, in the exemplary embodiment of the invention the sheets pass first through suitably spaced edge guide rollers 148, and then through guide brackets 149 disposed above and below the sheet path to a bank of vertically spaced guide rollers 150. Immediately prior to entering the edge treating mechanism, the sheet passes through an opposed pair of guides 151, provided with hard-faced surface contact portions 152 at their ends adjacent the edge treating mechanism. As shown, the lower guide 151 is fixedly mounted, and the upper guide is pivotally mounted at 153, the free end of the guide being resiliently maintained in contact with the sheet by spring means 154 contained within the housing 155. After passage through the edge treating mechanism, the sheets are engaged by a pair of guides 156, these guides being similar to the guides 151, but oppositely disposed, so that the hard-faced surface contact portions of both guide pairs firmly control the sheets in passage through the edge treating mechanisms. After passage through guides 156, the edges of the sheets are supported by brackets 157 extending substantially to the end of the conveyor section.

At the end of the conveyor section is located the driven outfeed shaft 44, which carries a plurality of outfeed rollers 158. Above each outfeed roller a backing roller 159 is mounted in cooperative relationship therewith on a backing shaft 160, journalled in the arms 161 extending from the machine frame. Suitable means may be provided to resiliently bias the backing shaft and rollers against the outfeed rollers, and all or part of the rollers may be surfaced with resilient material if desired, to firmly grip the sheets without damage thereto.

A flange 162 at the remote end of the transfer table mounts a plurality of switches 163, operative, when all of their contact arms 164 are engaged by a sheet, to actuate a pneumatic cylinder 165 mounted at one side of the transfer table. The pneumatic cylinder 165 carries at the outer end of its piston rod a pusher block 166, adapted to engage a steel sheet on the transfer table and impel it in the lateral direction.

At the opposite end of the transfer table (see Figures 2 and 4) a transfer roller 167 is mounted on transfer shaft 168. The transfer roller may be backed by roller 169 mounted on a shaft 170 disposed above the level of the transfer table. The transfer roller 167 may be driven constantly through a chain 171 by an electric motor 172. The stroke of pneumatic cylinder 165 is adequate to engage the opposite end of a steel sheet between the transfer roller 167 and its backing roller 169, whereupon the sheets may be driven by the transfer roller and ejected laterally from the transfer table, usually to a succeeding machine in line. The operation of pneumatic cylinder 165 is controlled by a multi-way solenoid operated valve 173.

As best shown in Figure 5, the elevator platform 31 is supported by a piston 174, extending from hydraulic cylinder 175. As an outstanding feature of the invention, means are provided to automatically extend the piston 174 and raise platform 31 as sheets are removed therefrom, so that the upper level of the sheet stack 32 on the platform will be maintained at substantially constant level relative to the feed carriage. To effect this end, a control mechanism 176 is disposed adjacent the sheet stack 32, with its contact arm 177 extending inwardly over the top of the stack. Arm 177 extends radially from one end of stub shaft 17, rotatably mounted in control casing 179, and the other end of the stub shaft mounts a cam 180, constantly urged to rotate in the clockwise direction, as viewed in Figure 21, by a spring 181 extending therefrom to casing 179, whereby the arm 177 is maintained in contact with the top of the sheet stack.

The control casing 179 encloses a switch 182, upon which the pivotal arm 183, bearing at its outer end cam follower 184, is mounted, the pivotal arm and cam follower being aligned with and resiliently urged against the outer surface of cam 180. An indentation 185 is provided in the surface of cam 180.

Oil for the operation of the pneumatic cylinder is contained within reservoir 186 (see Figures 7 and 24), and is forced therefrom under pressure to the pneumatic cylinder by an inching pump designated generally 187. An inlet line 188 leads from the reservoir through check valve 189 to the inching pump, and an outlet line 190 from the pump through check valve 191 to the cylinder.

As best shown in Figures 22 and 23, the pump 187 is driven by stub shaft 54, to an end of which is fixed a drive disc 192, upon which piston rod 193 is eccentrically mounted. The drive disc 192 carries on its periphery a cam lobe 194, adapted to engage and close the switch 195 disposed above the drive disc and in alignment with its lobe, in the course of each rotation of the drive disc.

Inching pump 187 comprises a two-part housing 196, and an elongated piston 197 mounted for reciprocation therein. A coil spring 198 extends between the pump housing and one side of the piston, tending to force the piston into remote or retracted position. The rod 193 terminates in ball end portion 199, adapted to engage the concave sided bearing block 200 mounted on the other side of the piston, at the bottom of guide recess 201.

Mounted above the inching pump housing is a solenoid 202, to the plunger 203 of which a pivoted spring 204 is engaged. To the other end of spring 204 is fixed a stop plunger 205, which extends downwardly through the aperture 206 of the pump housing, into the interior thereof. In down position, as shown, stop plunger 205 is adapted to engage the inner end of piston 197 and prevent retraction thereof, in which event the ball end portion of piston rod 193 reciprocates within guide recess 201 without effecting corresponding reciprocation of the piston.

A return line 207 leads from the hydraulic cylinder 175 back to reservoir 186, the return line being normally closed by valve 208. To accelerate return of the fluid, and consequent lowering of the elevator platform, a hydraulic pump 209 may be provided in this line. The pump 209 may conveniently be driven by the motor 89 driving air pump 88, as shown in Figure 7.

The operation of the apparatus will now be described in detail. Elevator platform 31 being lowered and having a stack 32 of sheets properly positioned thereon, operation of the machine may be initiated by closing main switch 210 (Figure 24), by means of which all three motors 40, 89 and 172 may be energized. Motor 40 will drive conveyor chains 48 through shafts 44 and 46, and power will be transmitted through the conveyor chains to shaft 50, and therefrom to stub shaft 54.

As previously indicated, the roller arm 127 extending from rock shaft 121 is constantly maintained in pressure contact with the surface of cam 58, driven by the stub shaft 54, whereby the roller arm and stub shaft are caused to rock as the cam following roller 128 follows the uneven surface of cam 58 in the course of its rotation. This rocking movement is transmitted through arms 122 and pivotal links 123 to the feed carriage 36, which is caused to reciprocate thereby from the position shown in full lines in Figure 5 substantially to the position indicated in dotted lines in that figure, corresponding to a position of the feed carriage above the adjacent end of the conveyor section of the machine.

The rotation of stub shaft 54 is also transmitted by chain 55 to shaft 56, which bears at the opposite end thereof the cams 102 controlling the operation of feed elements 65, whereby the operation of the feed elements is exactly coordinated with the reciprocation of the feed carriage. The cams 102 and the feed control valve 92 are designed to effect extension or lowering of the rods 81 and vacuum cups 84 of the feed elements at the end of the feed carriage stroke terminating directly above the sheet stack. A short interval after extension of the hollow rods, vacuum is applied to the interior thereof, whereby the top sheet 33 is firmly gripped by the vacuum cups. Next, pressure is applied to the feed elements to retract rods 81, whereby the top sheet 33 is lifted off the pile. Simultaneously with the movement last described, rocking movement of the arms 122 is initiated, whereby the feed carriage is caused to move in the direction of the machine conveyor. At the opposite end of the feed carriage stroke, the vacuum in the hollow rods and vacuum cups is released, whereby the sheet is dropped onto the conveyor support bars 51. Rocking of the arms 122 back to initial position is then begun, and at the end of the return stroke the pressure effecting retraction of the piston rods is released, whereby the rods extend, engaging their vacuum cups to the new sheet 33 now on top of the stack.

The operation of the feed elements 65 will be readily understood from Figures 8 and 9. In the absence of pressure in pressure line 69, or vacuum in vacuum line 70, both compartments 78 and 79 of each feed element will be at atmospheric pressure, and spring 80 will be effective to maintain piston 76 in remote position, and the connected hollow rod 81 and its vacuum cup 84 in extended position, as illustrated in Figure 8. Upon vacuum being applied to compartment 78 through line 70, the vacuum will be transmitted through rod 81 and passage 87 to the vacuum chamber 86 of the vacuum cup, whereby the cup will firmly grip the sheet 33 upon which it rests, in conventional manner. Employing cylinders of ordinary diameter, the atmospheric pressure in compartment 79 will be insufficient to elevate piston 76, and its rod and the sheet depending therefrom, against the action of spring 80.

Upon the application of pressure to compartment 79 through line 69, however, spring 80 will be compressed, and the piston, rod, cup and sheet elevated to the relative position illustrated in Figure 9, the bumper disc 85 limiting the upper end of the stroke. Upon the subsequent entry of air to vacuum compartment 78 to break the vacuum therein, sheet 33 will be released and allowed to fall of its own weight, but the piston, rod and cup will be maintained in elevated position by the pressure in compartment 79. Upon release of the pressure from compartment 79, spring 80 will again effect extension of the piston, rod and cup to the position of Figure 8, whereby the vacuum cup will be moved into engagement with a new sheet 33 on top of the sheet stack. Sheet gripping and sheet lifting are thus separately powered, whereby outstandingly efficient operation is attained, particularly in handling heavy steel sheets.

As an outstanding feature of the invention, all of the operations of the feed elements are controlled by the novel control valve 92, best shown in Figures 11 to 14. The configuration and relative positioning of cams 102 is illustrated in Figure 14, and for the purpose of explanation the feed cycle may be considered as beginning with both valve rods 94 in down position, both cam followers being depressed by the aligned positions of cam lobes 103. In this valve position, chambers C and D of each side of the valve are sealed off from chambers A and B by the discs 116 seated on seats 120. Air pump 88 is permitted to recirculate through line 90, chambers C and D, cross passage 110, chambers D' and C', and vacuum or return line 91. Pressure line 106 and vacuum line 107, leading to the feed elements, are both open to the atmosphere through cross passage 108 and port 109, whereby both compartments of each feed element are at atmospheric pressure, and the rods and cups thereof are extended due to the springs 80, the springs forcing the cups into engagement with the steel sheet therebelow.

The cams rotating in counterclockwise direction as viewed and indicated in Figure 14, cam lobe 103' first clears the cam follower 100', permitting the valve rod 94' of the vacuum side of the valve to be elevated by spring 96'. By the elevation of the valve rod, discs 112' and 113' are seated, respectively, on seats 114' and 115', and the disc 116' is lifted off its seat 120'. The vacuum side of pump 88 is now in direct communication through pump chambers C' and B' with vacuum line 107, and the communication passage is isolated from the atmosphere ports 109 and 111 by discs 114' and 115'. Accordingly, vacuum is applied directly to the vacuum compartments 78 of the feed elements, whereupon the vacuum caps thereof firmly grip the engaged steel sheet. Pressure air from the air pump is permitted to exhaust through line 90, pump chambers C and D of the pressure side of the pump, through cross passage 110 and passage 111 to the atmosphere.

Next in the sequence of operations, cam 103 clears cam follower 100, permitting the valve rod 94 of the pressure side of the control valve to be elevated by spring 96. The elevation of valve rod 94 seats discs 112 and 113 on seats 114 and 115 respectively, and causes disc 116 to be lifted off its seat 120. In this manner, the pressure side of pump 88 is placed in direct communication through pump chambers C and B with the pressure line 106 leading to the feed elements, and the chambers C and B are isolated from atmosphere ports 109 and 111. Accordingly, pressure air is conveyed to the pressure compartments 79 of the feed elements, and causes the vacuum cups and the sheet engaged thereby to be elevated, in the manner previously described.

It will be evident that this condition obtains during substantially 180° of revolution of the cams 103, during which time the feed carriage traverses to a position over the adjacent end of the machine conveyor. At this time, the leading edge of cam lobe 103' engages and depresses cam follower 100', depressing valve rod 94' so that the discs 112' and 113' are removed from their respective seats, and the disc 116' is seated upon seat 120'.

The vacuum side of the pump is now placed in communication through line 91, pump chambers C' and D', and passage 111 with the atmosphere, and the vacuum line 107 is opened to the atmosphere through valve chambers B' and A' and passage 109, whereby air is admitted to the vacuum compartments of the feed elements, and thereby to the interior of the vacuum cups, breaking the vacuum therein and permitting the engaged steel sheet to fall onto the machine conveyor. The pressure side of the pump is maintained is open communication with the pressure compartments of the feed elements, the valve rod 94 remaining in up position.

As the feed carriage moves away from the conveyor toward the sheet stack, the feed elements are maintained in up or retracted position by the pressure in their pressure compartments. When the feed carriage reaches a position directly above the sheet stack at the end of its return traverse, the leading edge of cam 103 engages and depresses cam follower 100, whereby the valve rod 94 is depressed against the action of its spring 96, and the control valve is returned to the position originally described, wherein the pressure compartments of the feed elements are in open communication with the atmosphere through port 109, and may exhaust therethrough. Upon this occurrence, the feed element springs 80 function to force the feed element pistons downwardly, and extend the associated piston rods and vacuum cups, whereby the vacuum cups 84 of the several feed elements are forced into engagement with the sheet 33 now on top of the sheet stack.

As each successive sheet is dropped onto the conveyor section of the machine, it is promptly aligned by the mechanisms 57, the cams 129 being suitably fixed to shaft 56 to effect this coordination. As the cam follower 135 follows cam groove 130, arms 132 are caused to reciprocate pivotally about their pivot 131, moving guide roller 133 into and out of aligning engagement with the sheet. The swinging reciprocation of arms 132 is communicated through lug 147 and slide 142, through rocker arm 139 and pivot 136, to arms 137, whereby they are caused to reciprocate pivotally about their pivot 136 into and out of aligning relationship with the upper surface of the sheet. The final position of guide plate 138 is adapted to insure that the steel sheet is down far enough onto the conveyor to be engaged by drive lugs 52 of the conveyor chains, and to preclude undue buckling or curling of the sheet. Immediately after a sheet is dropped, the cam follower 135 is displaced to the extreme position shown in Figure 11, the corresponding operative positions of guide roller 133 and guide plate 138 being shown in solid lines therein. The retracted or inoperative position of these elements is indicated in dotted lines in Figure 11.

The drive lugs 52 are so positioned in the conveyor chains, and the chain movement properly coordinated, that the rear edge of the sheet is engaged by the lugs as the guide rollers 133 and guide plates 138 reach the solid line position of Figure 11. The sheet is then conveyed by the lugs toward the edge treating mechanisms 38, being properly aligned for entry into the successive aligning mechanisms illustrated in Figures 16 to 19. In being conveyed, the sheet is supported primarily by support bars 51, which, together with other machine elements contacting the sheets, may be suitably surfaced or designed to avoid injury to the sheet surfaces.

The sheet is carried by the conveyor lugs, and guided by the mechanisms of Figures 16 to 19, through the treating mechanisms 38, if provided, and therebeyond until the leading edge of the sheet is engaged between the outfeed rollers 158 and their backing rollers 159. By suitable selection of driving sprocket sizes, the outfeed rollers 158 may be driven at somewhat greater peripheral speed than that of the conveyor chains, so that as each sheet is engaged between the outfeed rollers and backing rollers, it is accelerated thereby and forcibly discharged onto transfer table 39.

The plate is stopped by the transfer table end flange 162, and in coming to rest thereagainst in proper alignment therewith, the steel sheet displaces all of the switch contact arms 164, thereby closing switches 163. As is evident in Figure 24, the closing of the several switches is effective to energize the solenoid operated valve 163, thereby admitting pressure air (which may conveniently be supplied by pump 88) to pneumatic cylinder 165. The cylinder is thereupon operative to extend its piston rod and pusher block 166 at the end thereof, the pusher block engaging the adjacent edge of the steel sheet and displacing the sheet laterally a distance sufficient for it to be engaged between transfer roller 167 and its backing roller 169. As previously indicated, these rollers, driven by motor 172, are effective to eject the sheet from the transfer table, usually to another machine in line. As the trailing end of the sheet being ejected clears switches 163, they open successively. Upon the opening of the first switch, the circuit to the solenoid operated valve 173 is broken, whereupon it reverses and effects retraction of the piston rod and pusher block of pneumatic cylinder 165.

As each sheet moves along the conveyor, succeeding sheets are positioned behind it at suitable space intervals. As sheets are successively removed from the stack 32, the top level thereof is, of course, lowered, and since the extension of the feed element rods is limited, if the stack remained stationary the top level would soon be lowered to a point at which the vacuum cups would not engage the top sheet. Accordingly, novel means are provided to automatically maintain the top of the sheet stack at desired level relative to the path of the feed carriage.

The hydraulic system employed for this purpose is diagrammatically illustrated in Figure 24, wherein it will be seen that oil is drawn from reservoir 186 through line 188 and check valve 189, and supplied to the cylinder 175 by inching pump 187, through line 190 and check valve 191. A return path for the oil is provided by line 207, which includes valve 208 and pump 209.

The inching pump 187, in common with the feed carriage and aligning mechanisms, is driven by stub shaft 54. As best shown in Figure 22, rotation of the stub shaft effects corresponding rotation of the drive disc 192, which drives the eccentrically mounted piston rod 193, whereby the strokes of rod 193 coincide with the removal of sheets from the sheet stack.

To accommodate variations in sheet thickness and other variables, the inching pump is made with high volumetric capacity, preferably sufficient to elevate the elevator platform several sheet thicknesses by a single pump stroke. The stop plunger 205 associated with solenoid 202 is effective in down position, it will be understood, to maintain the pump piston 197 in outward position, the piston remaining stationary while ball end portion 199 of the rod reciprocates with the piston guide recess 201. When the stop plunger is retracted to up position, the piston is permitted to follow the rod and make a pump stroke, as will be described hereinafter.

The action of the stop plunger 205 is controlled, as seen in Figure 24, by control mechanism 176 and switch 195. The action of control mechanism 176 (Figures 20 and 21) is as follows. As individual sheets are lifted off the sheet stack 32, control arm 177 is rotated upwardly thereby until clear, whereupon the arm is returned to the top of the stack by spring 181. As the control arm rotates upwardly, cam 180 rotates in the counterclockwise direction as viewed in Figure 21, and cam follower 184 rides the cam without moving arm 183. Similarly, when the control arm is returned downwardly, cam 180 rotates in the clockwise direction, and the cam follower may follow without displacement. When the level of the stack is sufficiently lowered, however, the return movement of the control arm is adequate to bring the cam indentation 185 to the position of the cam follower, which thereupon moves into the indentation. The resultant movement of switch arm 183 is effective to close switch 182. Switch 182 is closed, then, after each sheet removal which leaves the top level of the stack below a predetermined limit.

As seen in Figures 22 and 23, the switch 195 is momentarily closed by cam lobe 194 mounted on drive disc 192 in the course of each revolution of the drive disc, approximately midway of the withdrawal stroke of rod 193. Stop plunger 205 is normally maintained in down position by spring 204, whereby piston 197 is maintained stationary during the initial portion of each withdrawal of the rod. Drive disc 192 is suitably mounted on stub shaft 54 so that the lobe 194 engages and closes switch 195 while the contact arm 177 of control mechanism 176 rests upon the top of the stack, that is, shortly after a sheet has been lifted from the stack. The switches being in series, if at the moment switch 195 is closed, switch 182 is also closed by reason of the position of arm 177 resting on a low stack, a circuit through solenoid 202 is momentarily closed, whereupon its plunger 203 immediately retracts stop plunger 205.

As the stop plunger is withdrawn, spring 198 causes pump piston 197 to move rapidly rearwardly until its bearing block 200 engages the ball end of the rod, after which the piston follows the rod through the remainder of its withdrawal movement and the succeeding pressure stroke. The rapid movement of the piston assures opening of check valve 189, and the pump chamber is filled with oil during the suction stroke of the piston. During the succeeding pressure stroke of the rod and piston, check valve 189 is closed and check valve 191 opened, and the oil in the pump chamber is forced into cylinder 175, extending the piston 174 and raising the elevator platform 31 a distance corresponding preferably to several sheet thicknesses.

The circuit through solenoid 202 is only momentarily closed, and is immediately thereafter opened by rotation of lobe 194 away from switch 192. As the circuit is opened, stop plunger 205 tends immediately to return to normal down position, but is prevented by the position of piston 197 thereunder. Accordingly, the stop plunger rides the side of the piston until the end of the pressure stroke, whereupon the plunger falls to normal position behind it. The piston is thus held stationary at least until rod 193 has partially withdrawn, when switch 195 is again closed. If at this time, the level of the sheet stack is again sufficiently low to permit closing of switch 182, the stop plunger will again be withdrawn, and the pump will operate through another cycle. On the other hand, if the sheet stack has been elevated several sheet thicknesses by the previous pump stroke, the succeeding closing of switch 195 will find switch 182 open, and the inching pump will not again function until a closing of switch 195 coincides with a closing of switch 182. The action of the inching pump, then, is effective to maintain the top of the sheet stack within a predetermined range, wherein the top sheet can be effectively engaged by the vacuum cups of the feed elements.

When the sheet stack has been depleted, piston 174 may be retracted for placement of another stack on the elevator platform, conveniently by opening valve 208, whereupon pump 209 will assist the return of oil to the reservoir. The inching pump may be suitably deactivated during this operation, as by holding means maintaining switch 182 open when valve 208 is open, or the inching pump may be permitted to continue operation, employing a pump 209 of greater volumetric capacity. When the elevator platform has been lowered to its extreme limit, a new sheet stack of suitable height may be positioned thereon, valve 208 closed, and the device will operate automatically as before. If a short stack is placed on the platform, the inching pump will quickly bring it up to desired level.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. In combination, a conveyor comprising spaced, parallel support bars, drive chains disposed between said support bars and parallel thereto, said drive chains extending below the level of the upper surfaces of said support bars, drive lugs extending from said drive chains above the level of the upper surfaces of said support bars, mechanism associated with the infeed end of said conveyor to align articles placed thereon, means for driving said conveyor chains and aligning mechanism in coordinated manner whereby said drive lugs engage an article on said conveyor substantially immediately after the operative functioning of said aligning mechanism, and guide means disposed laterally of said conveyor to control the movement of sheet articles driven therealong by said drive lugs.

2. In combination, a conveyor comprising spaced, parallel support bars, drive chains disposed between said support bars and parallel thereto, said drive chains extending below the level of the upper surfaces of said support bars, drive lugs extending from said drive chains above the level of the upper surfaces of said support bars, mechanism associated with the infeed end of said conveyor to align articles placed thereon, and means for driving said conveyor chains and aligning mechanism in coordinated manner whereby said drive lugs engage an article on said conveyor substantially immediately after the operative functioning of said aligning mechanism.

3. In combination with a horizontal conveyor, a shaft extending transversely across said conveyor, a cam on said shaft, aligning mechanism disposed laterally of said conveyor, said aligning mechanism including a vertically pivoted guide roller laterally swingable relative to said conveyor and a horizontally pivoted guide member vertically swingable relative to said conveyor, and means operatively linking said aligning mechanism to said cam whereby the pivotal swinging movement of said guide roller and said guide member is controlled in accordance with the rotation of said cam.

4. In combination, a horizontal conveyor comprising spaced, parallel support bars, drive chains disposed between said support bars and parallel thereto, said drive chains extending below the level of the upper surfaces of said support bars, drive lugs extending from said drive chains above the level of the upper surfaces of said support bars, a shaft extending transversely across the infeed end of said conveyor, a cam on said shaft, aligning mechanism disposed laterally of the infeed end of said conveyor, said aligning mechanism including a vertically pivoted guide roller laterally swingable relative to said conveyor and a horizontally pivoted guide member vertically swingable relative to said conveyor, means operatively linking said aligning mechanism to said cam whereby the pivotal swinging movement of said guide roller and said guide member is controlled in accordance with the rotation of said cam, and means driving said conveyor chains and said shaft in coordinated manner whereby said drive lugs engage an article on said conveyor substantially immediately after the operative functioning of said aligning mechanism.

References Cited in the file of this patent

UNITED STATES PATENTS

| Number | Name | Date |
| --- | --- | --- |
| 677,062 | Combs | June 25, 1901 |
| 1,029,159 | Westerbeck | June 11, 1912 |
| 1,318,910 | Pfohl | Oct. 14, 1919 |
| 1,568,035 | Reynolds | Dec. 29, 1925 |
| 1,578,822 | Glover | Mar. 30, 1926 |
| 1,715,360 | Harrold | June 4, 1929 |
| 1,746,712 | Nasmith et al. | Feb. 11, 1930 |

(Other references on following page)

UNITED STATES PATENTS

| | | | |
|---|---|---|---|
| 1,783,940 | Trumble | Dec. 2, | 1930 |
| 1,907,208 | Lebel | May 2, | 1933 |
| 2,049,850 | Lytle | Aug. 4, | 1936 |
| 2,087,437 | Knight | July 30, | 1937 |
| 2,120,495 | Harris | June 14, | 1938 |
| 2,163,274 | Dixon | June 20, | 1939 |
| 2,203,823 | Jirousek | June 11, | 1940 |
| 2,217,983 | Hopkins | Oct. 15, | 1940 |
| 2,247,466 | Baker | July 1, | 1941 |
| 2,266,587 | Carlson | Dec. 16, | 1941 |
| 2,267,340 | Rupp | Dec. 23, | 1941 |
| 2,274,797 | Kluge | Mar. 3, | 1942 |
| 2,299,690 | Giese | Oct. 20, | 1942 |
| 2,341,521 | Baker | Feb. 15, | 1944 |
| 2,364,142 | Hildmann | Dec. 5, | 1944 |
| 2,435,915 | Williams | Feb. 10, | 1948 |
| 2,451,162 | Gates | Oct. 12, | 1948 |
| 2,466,795 | Crot | Apr. 12, | 1949 |
| 2,484,845 | Nordquist | Oct. 18, | 1949 |
| 2,528,106 | Albrecht | Oct. 31, | 1950 |